(12) United States Patent
Goncharko

(10) Patent No.: US 7,905,005 B2
(45) Date of Patent: Mar. 15, 2011

(54) SEALING FOAM PANELS WITH A COMPRESSION-GENERATING JOINT

(75) Inventor: Michael Goncharko, Englishtown, NJ (US)

(73) Assignee: TCP Reliable, Inc., Edison, NJ (US)

( * ) Notice: Subject to any disclaimer, the term of this patent is extended or adjusted under 35 U.S.C. 154(b) by 1043 days.

(21) Appl. No.: 11/670,602

(22) Filed: Feb. 2, 2007

(65) Prior Publication Data

US 2008/0185495 A1    Aug. 7, 2008

(51) Int. Cl.
  *B23P 11/00* (2006.01)
  *B23Q 3/00* (2006.01)
  *F16M 13/00* (2006.01)

(52) U.S. Cl. .................. 29/525.01; 29/464; 248/620

(58) Field of Classification Search .............. 29/525, 29/525.01, 525.04, 525.11, 525.13, 450, 29/464, 466, 468; 248/620; 206/600; 220/4.33, 220/423, 424, 529, 592.2, 592.27; 229/103.11
See application file for complete search history.

(56) References Cited

U.S. PATENT DOCUMENTS

| 3,940,804 | A | 3/1976 | Benton |
| 5,377,470 | A | 1/1995 | Hebinck |
| 5,450,977 | A | 9/1995 | Moe |
| 5,671,913 | A | 9/1997 | Vesper |
| 2005/0189404 | A1 | 9/2005 | Xiaohai et al. |
| 2005/0204697 | A1 | 9/2005 | Rue |
| 2006/0059847 | A1 | 3/2006 | Rice |

FOREIGN PATENT DOCUMENTS

GB    2261462    5/1993

*Primary Examiner* — John C Hong
(74) *Attorney, Agent, or Firm* — Eric P. Mirabel

(57) ABSTRACT

A method of joining panels of foam materials such that edges are compressed into panel surfaces to provide a secured and effectively sealed structure is disclosed. Panels in an orthogonal relationship to each other, which are made of foam (or other materials not intended to be load bearing) can be joined by compressing the outer side of one of the panels into the edge surface of an adjoining panel. This is done using two plates, one resting on the outer side of the first panel, and one inserted into the side of the second panel, where the plates are connected by a bolt, screw or wire under tension.

7 Claims, 3 Drawing Sheets

SEALING FOAM PANELS WITH A COMPRESSION-GENERATING JOINT

FIELD OF THE INVENTION

The invention relates to a method of sealing foam panels, using compression-generating joint, rather than adhesion.

BACKGROUND

Containers made of foam insulating materials, including insulated shipping containers, provide excellent insulation for their contents. Such insulated shipping containers are widely used to maintain the temperature of shipped materials near refrigeration levels, thereby promoting preservation of the material. Such containers can be made from a number of foam materials including expanded polystyrene (EPS), extruded polystyrene (XPS) and Urethane. Such containers are generally made by molding, or they can be formed from bonded panels. Bonding works nearly as well as molding to provide hermetic sealing at the edges, and maintain comparable insulating properties.

The disadvantages of bonding or molding is the cost and time involved. Molding can generally only be done by the container manufacturer, and thus there is a limit on the size and shapes of containers available. Smaller or larger containers are desirable for shipping materials of different dimensions. Bonding can be done on-site, but it time-consuming and labor-intensive to accomplish. Also, unless done in accordance with specifications, it may result in a container which is considerably weaker than a molded container. Thus, a simple, fast, inexpensive method of joining insulating panels, which achieves a strong container, is desirable.

SUMMARY

The joining panels of foam materials such that edges are compressed into panel surfaces to provide a strong effectively sealed structure, is disclosed. Panels in an orthogonal relationship to each other, which are made of foam (or other materials not intended to be load bearing) can joined by compressing the outer side of one of the panels into the edge surface of an adjoining panel. This is done using two plates, one resting on the outer side of the first panel, and one inserted into the side of the second panel, where the plates are connected by a bolt, screw or wire under tension.

The panels can be any foam material, including expanded polystyrene (EPS), which has sufficient structural rigidity and can hold the second plate when it is inserted in place. This can be accomplished quickly by simply heating the second plate to melt a slot to accommodate it in the side of the second panel, which is then connected with a threaded bolt to a first plate positioned on the outer side of the first panel. Other means of connecting the plates are also possible, such as connection with a wire under tension, passing through and joining the plates. Other means of making a slot in the second panel are also possible, such as cutting, or simply pushing the second plate into place unheated.

The plates can be placed in position using a template, which has at least two substantially planar, orthogonal sides. The template has a slot to accommodate the second plate in proper position for insertion into the second panel. Where the plates are joined with a treaded bolt or screw, the second plate has a hole positioned to align with a hole in the first plate, and the template has a hole in the appropriate side which aligns with the holes in the first and second plates.

A hole in the foam panels to accommodate the bolt can be made by drilling, or simply by heating the bolt or screw and pushing it into place through the foam, then removing it (or even inserting it unheated). After the template is removed, tightening the bolt (or tensioning a wire or another joining mechanism) pulls the panels against each other, compresses the foam at the region where the panels are joined, and creates a secure, hermetically sealed joint. The bolt should be tightened until both foam panels mate with no gaps, and the plate on the end compresses the foam by approximately the thickness of the plate.

An advantage of the joining mechanism described here is that appliances can be readily added to the plates, and can be readily secured to the final product, by securing an appliance to the second plate by passing the bolt through a hole in such an appliance. Such appliances could include hinges, straps or brackets.

DETAILED DESCRIPTION

Figure 1:
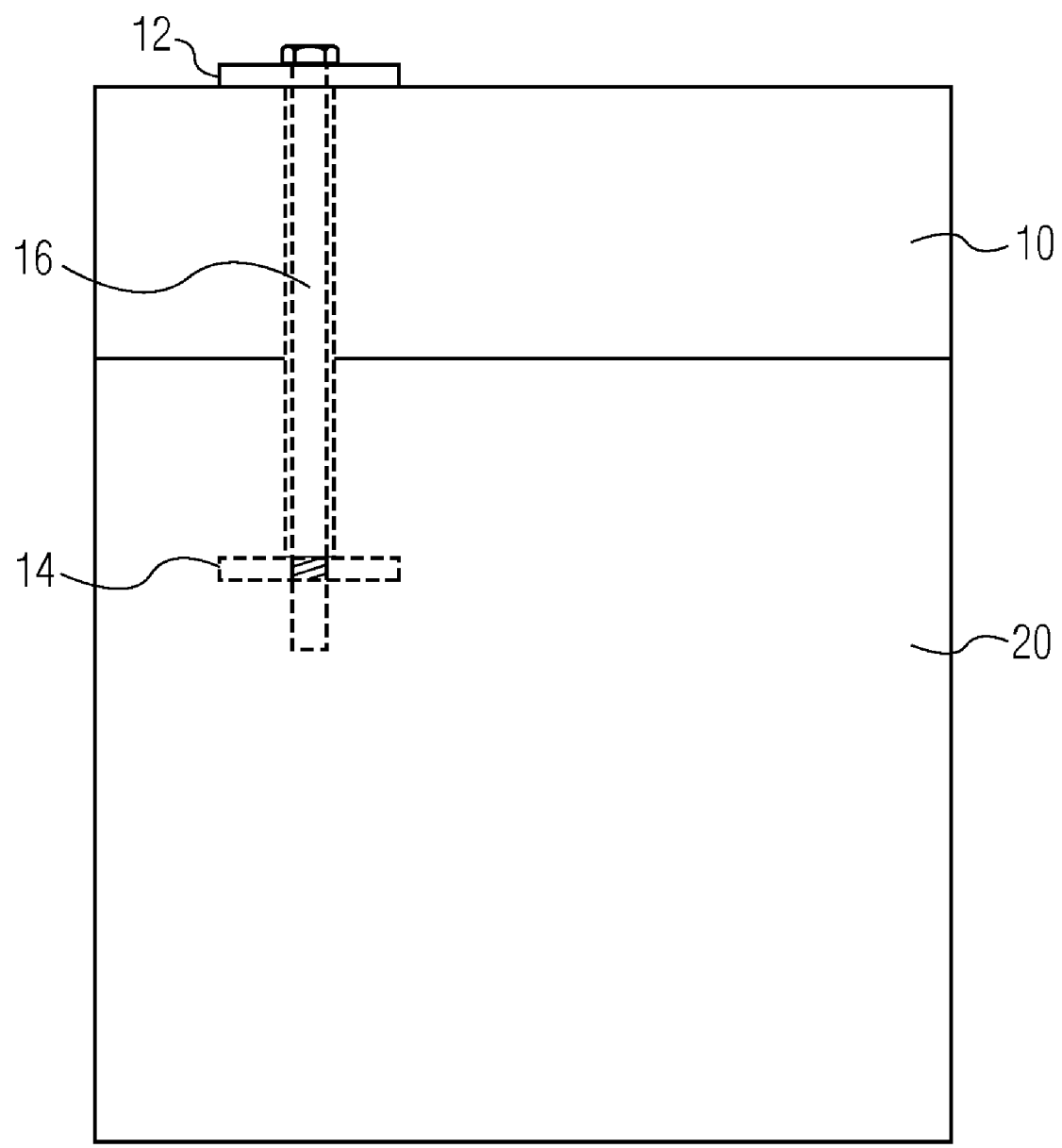
FIG. 1 shows a plan view from one side of two panels joined by a bolt through two plates.

In FIG. 1, an upper foam panel 10 is joined to a the edge surface of a foam panel 20, using a plate 12 resting on the outer surface of panel 10, which is drawn towards plate 14 (inserted into the panel 20), using a threaded screw or bolt 16. Bolt 16 threads into mating threads in plate 14 and passes through aligned holes in panels 10 and 20. As described above, the holes in the panels 10 and 20, and a slot in panel 20 for inserting plate 14, can be made by drilling/cutting; melting or simply pushing through the foam material of the panels. Tightening bolt 16 mates the adjoining surfaces of panels 10 and 20 and creates an airtight seal.

Figures 2, 2A:
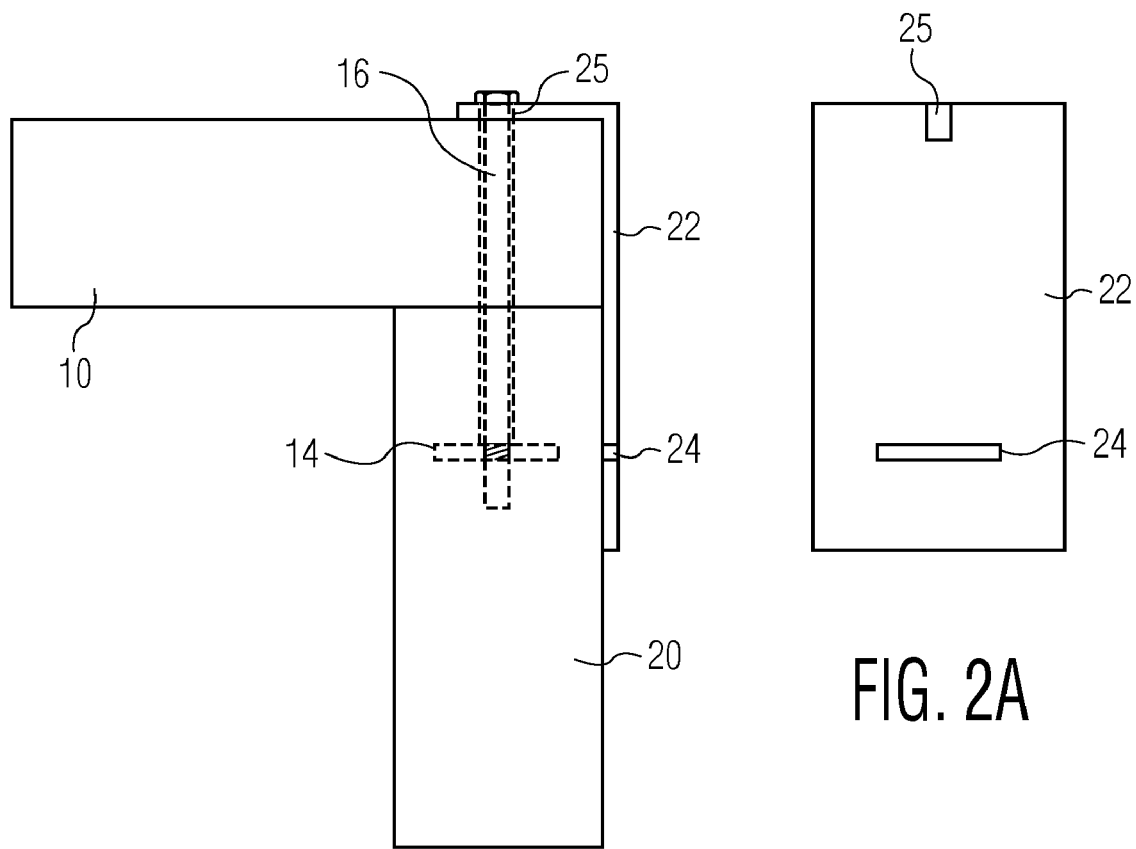
FIG. 2 depicts a side view of an alignment bracket for the plates of FIG. 1 in position on two panels.
FIG. 2A is a plan view of the alignment bracket.

FIGS. 2 and 2A depicts the alignment template 22 used for aligning the plates 12 and 14. Template 22 includes a slot 24 through which plate 14 is inserted, so as to position it correctly so that the treaded hole in plate 14 aligns with a corresponding hole in plate 12 and hole 25 the template 22.

Figures 3, 4:
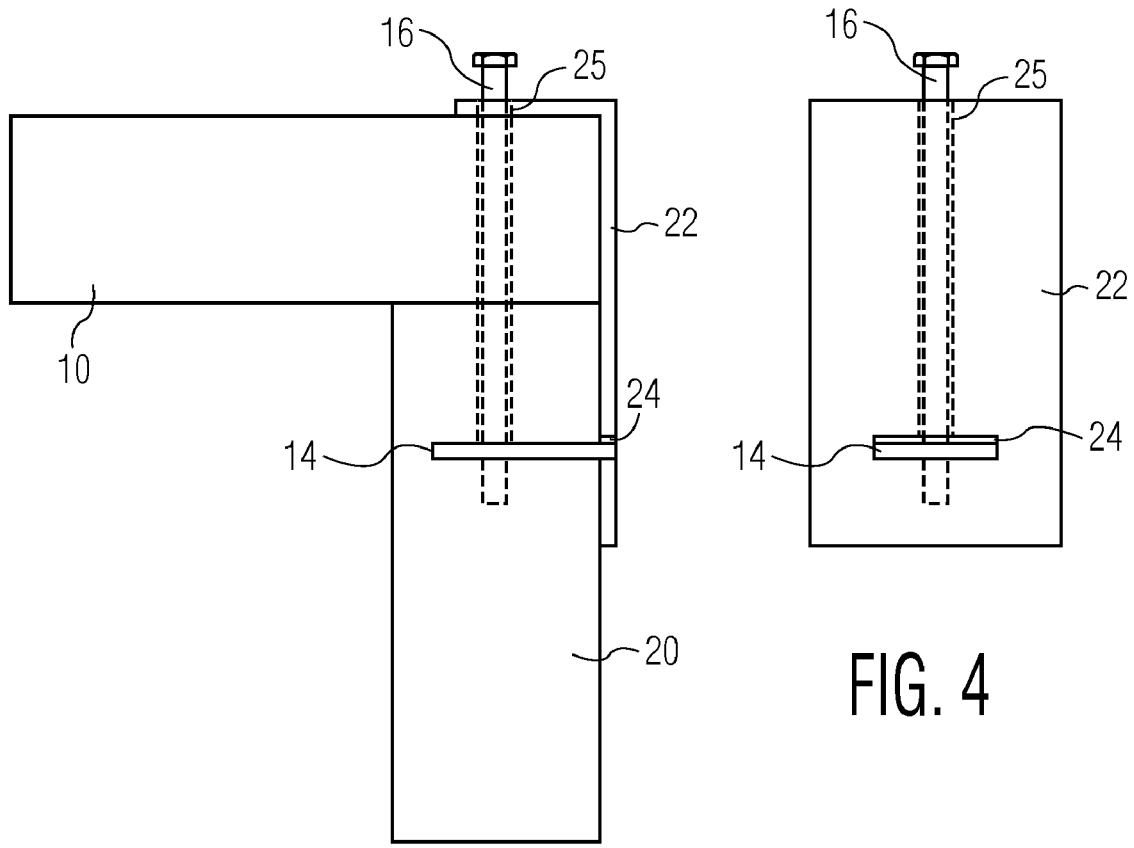
FIG. 3 is a side view the alignment bracket of FIG. 2, with one of the plates in position.
FIG. 4 is a plan view of the alignment bracket and the one plate positioned as in FIG. 3.

FIG. 3 and FIG. 4 depict the template 22 and the bolt 16 in place in the panels 10 and 20. Template 22 would be removed once plate 14 is in place and aligned with hole 25, plate 12 would be placed in position on the upper surface of panel 10, bolt 16 would be tightened to bond and seal panels 10 and 12.

Hinges, straps or brackets or other appliances can be attached to the joined panels 10 and 20 (and the resulting box) by, for example, securing them using the bolt 16. Where several such joints are made in a box, more bolts are available for securing such appliances.

The terms, expressions and examples herein are exemplary only, and not limiting, and the scope of the invention is defined only in the claims which follow and includes all equivalents of the claimed subject matter.

What is claimed is:

1. A method of joining panels of foam materials by compression so as to provide a seal at the joints, comprising:

placing the panels to be joined in an orthogonal relationship to each other, such that an edge surface of a first panel rests on a first planar surface of a second panel;

providing a template having two orthogonal sides, designed such that a first orthogonal side can contact a planar surface of the first panel while the second orthogonal side contacts the planar surface of the second panel which opposes the first planar surface; and wherein the first orthogonal side contains a slot, the slot sized to permit a first plate having a first hole through it to pass through the slot and into the first panel in a position parallel to the second orthogonal side such that the first hole is aligned with a particular spot on the second orthogonal side;

inserting the first plate through the slot and into position;

removing the template;

placing a second plate having a second hole through it on the planar surface of the second panel which opposes the first planar surface in a position such that the first and second holes are aligned;

joining the first and second plates with a bolt, screw or wire passing through the first and second holes; and tensioning the bolt or wire such that the first and second plates are pulled towards each other and the edge surface of the first panel is pressed into the first planar surface of the second panel and said surfaces are sealed.

2. The method of claim 1 wherein the first hole is threaded and the bolt threads into the threaded first hole to provide the tension.

3. The method of claim 1 wherein the template and the first and second plates are sheet metal.

4. The method of claim 1 wherein the panels are made of expanded polystyrene.

5. The method of claim 1 further including the step of heating the first plate or the area of the first panel where the first plate is inserted.

6. The method of claim 2 wherein the second hole is larger than the diameter of the shaft of the bolt.

7. The method of claim 2 wherein the second plate is a hinge or bracket.

* * * * *